United States Patent

[11] 3,616,131

| [72] | Inventor | Frederik A. Hardick<br>Enschede, Netherlands |
|---|---|---|
| [21] | Appl. No. | 693,331 |
| [22] | Filed | Dec. 26, 1967 |
| [45] | Patented | Oct. 26, 1971 |
| [73] | Assignee | Luctem Etablissements<br>Vaduz, Liechtenstein |
| [32] | Priority | Dec. 29, 1966 |
| [33] | | Germany |
| [31] | | L 55391 |

[54] FABRICATED THERMOPLASTIC SHEET MATERIALS FOR THE INTERCONNECTION OF LAMELLAR BODIES
6 Claims, 3 Drawing Figs.

[52] U.S. Cl. .................................................. 161/57,
156/181, 156/296, 156/434, 161/58, 161/143, 161/146
[51] Int. Cl. ........................................................ B32b 5/12
[50] Field of Search .................................................. 117/37, 43, 44; 156/178, 179, 180, 181, 290, 297, 296, 433, 434; 161/55, 57–60, 84, 85, 142, 143, 39, 146, 148, 150; 118/241

[56] References Cited
UNITED STATES PATENTS

| 197,502 | 11/1877 | Turner et al. | 161/55 UX |
|---|---|---|---|
| 2,522,527 | 9/1950 | Manning | 161/55 UX |
| 2,772,993 | 12/1956 | Magnuson | 161/84 |
| 3,186,893 | 6/1965 | Mercer | 161/142 X |
| 3,391,042 | 7/1968 | Schimpf | 156/297 X |
| 3,442,736 | 5/1969 | Duns | 161/55 UX |
| 3,445,319 | 5/1969 | Dawbarn | 156/178 X |
| 3,459,615 | 8/1969 | Eilerman | 161/150 X |
| 2,919,467 | 1/1960 | Mercer | 264/167 X |

FOREIGN PATENTS

| 424,871 | 3/1935 | Great Britain | 161/146 |
|---|---|---|---|
| 476,745 | 5/1929 | Germany | 161/143 |

*Primary Examiner*—William A. Powell
*Attorney*—Michael S. Striker

ABSTRACT: A fabricated thermoplastic sheet material is provided for the interconnection of two or more lamellar bodies such as textile sheet materials, paper or the like. The fabricated sheet material has strips of thermoplastic material interconnected by reinforcing threads which strips adhere and establish connection between the laminar bodies upon application of heat and pressure. An apparatus is also provided for manufacturing the sheet material. The apparatus has a drum mounted for rotation about a horizontal axis and a thermoplastic dispensing device is arranged above the drum and is reciprocated back and forth to produce the thermoplastic strips on the surface of the drum. The strips of thermoplastic material are heated in a zone of the drum and thereafter reinforcing threads are pressed into the thermoplastic material to produce the sheet material in accordance with the invention.

PATENTED OCT 26 1971 3,616,131

Inventor:
Frederik Andries Hardick
By Michael S. Streker
Attorney

FABRICATED THERMOPLASTIC SHEET MATERIALS FOR THE INTERCONNECTION OF LAMELLAR BODIES

BACKGROUND TO THE INVENTION

Sheet materials for the interconnection of lamellar bodies are known in the form of thermoplastic foils. Such foils have the disadvantage that the connection produced imparts great stiffness to the finished structure. Furthermore, with the foils known hitherto it is disadvantageous that as a result of their relatively substantial thickness they constitute a relatively great mass of thermoplastic substance which often penetrates through the bodies being connected to one another to form spots on the outside of the structure.

If a connection is to be produced in which the pliancy of the body to be connected with one another is to be maintained, it is necessary to concentrate the thermoplastic as far as possible into small areas over the surfaces to be connected with one another leaving large areas free of connection. The application of thermoplastic into small areas is however extraordinarily complicated and achievable only by the correct application of the thermoplastic powder. This does not give any guarantee of uniform distribution of the individual adhesion points and their adequate separation from one another.

It would be possible per se to produce a connection which does not interfere with the pliancy of the bodies connected with one another due to the fact that the foil is divided into narrow strips extending parallel with one another and connected in a transverse direction only through a thin film which participates hardly or not at all in the joining operation. This arrangement would have the advantage that the parts of the thermoplastic substance in strip form produced, under the influence of temperature and pressure, a better adhesion of the bodies to be connected with one another and the known foils without noticeably impairing the pliancy. However, a foil of this kind can only be handled with difficulty, because the thin connections between the strips tear too easily and thus wastage occurs. Moreover, it is difficult to accurately cut the foil of this kind.

It is an object of the present invention to provide a fabricated sheet material for the purposes stated hereinbefore which overcomes the aforementioned disadvantages. It is a further object of the present invention to provide an apparatus for producing such fabricated sheet material.

SUMMARY OF THE INVENTION

According to the present invention there is provided a fabricated sheet material for interconnection of lamellar bodies upon application of heat and pressure, said sheet material consisting of:
a. a plurality of symmetrically arranged strips lying side by side, each strip being composed of a thermoplastic substance and having a nonrectilinear course; and
b. rectilinear reinforcing threads extending parallel to one another and interconnecting the strips.

The solution of the problem is based upon the consideration of the difficulties in the cutting of the sheet or foil known hitherto could be avoided if a sheet material with thermoplastic strips of nonrectilinear form could be manufactured reliably prevented from breaking up in the event of tension in the longitudinally transverse direction of the material. A sheet material made in accordance with the invention is convenient to handle and can be produced to any desired width and length. Furthermore, the sheet material produces a very pliant bond between the connected bodies and the adhesion is established with a quantity of thermoplastic substance which is relatively small in relation to the size of the area to be connected with one another. Due to the reinforcing threads the sheet material has a considerable tensile strength which can be determined by the selection of suitably sized threads.

The thermoplastic substance can be, for example, polyamide, polyvinylacetate, polyethylene, or a like synthetic plastic material which can be brought into flowable form or made into the form of pastes, solutions, dispersions or emulsions and possess film-forming properties.

Using a suitable thermoplastic substance in each case it is possible to adapt the finished connection to subsequent processes such as for example drycleaning or the washing of textiles.

In accordance with a practical construction of the invention the strips are arranged to take a zigzag course or an undulating course. So that all the strips of the material are protected against tensile forces it is further proposed that the spacing between the threads is less than width between a trough and an adjacent crest of one strip. Each of the strips in one complete zigzag or undulatory movement preferably crosses at least two reinforcing threads lying side by side, and the distance between the strips is preferably such that at least one thread is crossed by two strips lying side by side. Thus, a kind of network bond is obtained.

The production of the fabricated sheet material can be effected by means of an apparatus made in accordance with the invention.

Further according to the invention there is provided an apparatus for the manufacture of a sheet material, said apparatus comprising:
a. a drum;
b. means for mounting the drum for rotation about a horizontal axis;
c. a thermoplastic dispensing device disposed above the drum;
d. means for selectively reciprocating the dispensing device longitudinally of the drum to dispense strips of thermoplastic substance onto the drum in a nonrectilinear pattern;
e. means for heating a zone of the periphery of the drum;
f. a roller mechanism for feeding parallel reinforcing threads onto the drum for attachment to the thermoplastic strips after the latter have been heated in the heating zone; and
g. a roller mechanism for taking off a sheet material from the drum, said sheet material consisting of strips of symmetrically arranged thermoplastic substance lying side by side and rectilinear reinforcing threads extending parallel to one another and interconnecting the strips.

The heating means of the apparatus is effected over a heating zone disposed over part of the periphery of the drum and a cooling zone is preferably provided adjoining the heating zone. The heating and cooling can be effected, for example, with the aid of warm and cold air. The connection between the strips and the threads is set in the cooling zone and the finished product is thereafter taken from the drum onto the roller mechanism.

DESCRIPTION OF PREFERRED EMBODIMENT

Figure 1:
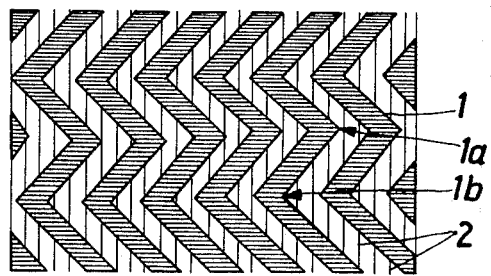
FIG. 1 is a plan view of a sheet material made in accordance with the invention.

As shown in FIG. 1 the sheet material has symmetrically arranged strips 1 of a thermoplastic substance extending side by side and equally spaced from one another. Each strip 1 extends across the sheet in a zigzag formation although it could extend in an undulatory manner. The strips 1 are connected by means of rectilinear thread 2 which constitute reinforcement and are composed of a lateral or synthetic fiber. Threads 2 are arranged parallel to one another, are equally spaced from one another and extend across the sheet. The spacing between adjacent threads 2 is smaller than the transverse distance between a trough of one of the strips 1, say 1a, and an adjacent crest 1b of the same strip 1.

Each of the strips 1 of the thermoplastic substance crosses several threads 2 so that the course of the strips cannot vary upon tension in the direction of the threads 2. The connection between the strips 1 and the threads 2 is effected by softening the strips 1 by heat action and bringing them into contact with the threads and thereafter cooling the whole structure.

Figure 2:
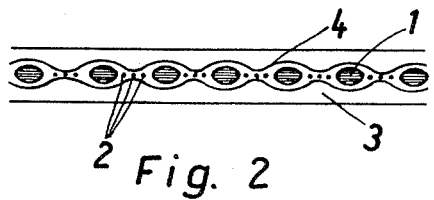
FIG. 2 is a lateral section through two lamellar bodies connected with the aid of the sheet material made in accordance with the invention.

The sheet material as shown in FIG. 1 serves for the connection of two or more lamellar bodies and by way of example two layers of material are shown connected in FIG. 2. A lower material layer 3 and an upper material layer 4 composed, for example, of textile cloth, or paper or other similar material have the sheet material of FIG. 1 therebetween. The sheet and, more particularly, strips 1 of the sheet are subjected to heat and pressure so that the strips 1 widen into approximately elliptical cross sections and constitute the adhesive connection between the layers 3, 4. The adhesive connection follows the parallel lines of the zigzag or undulatory form formed by the pattern of the strips 1. Due to the constant changes of direction of the strips and the spaces disposed between the adhesive connections the structure consisting of the layers 3, 4 retains its pliancy. The reinforcing threads 2 are generally very thin and do not impair the flexibility of the finished structure. Due to the arrangement of the strips and the threads the sheet material made in accordance with the invention is convenient to handle and can be easily cut to shape according to its application.

Figure 3:
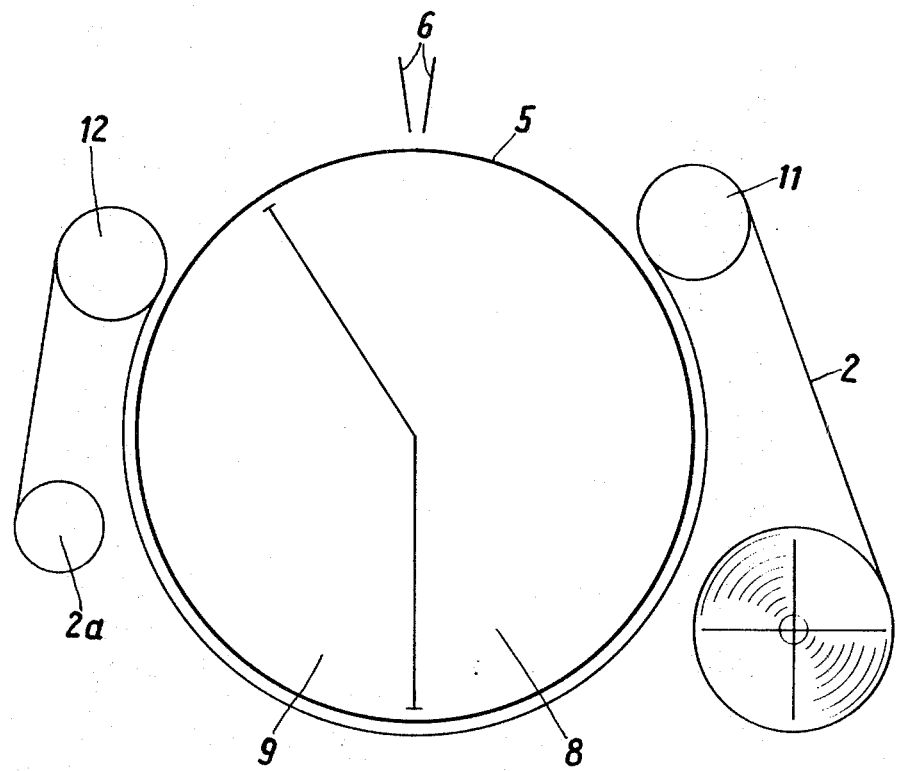
FIG. 3 is a diagrammatic representation of an apparatus for the production of the sheet material in accordance with the invention.

An apparatus for the production of the sheet material is shown diagrammatically in FIG. 3 and comprises a drum 5 mounted for rotation about a horizontal axis. A thermoplastic dispensing device 6 is arranged above the drum 5 and regulates the quantity of thermoplastic fed onto the drum 5. In this embodiment a device 6 consists of a number of nozzles corresponding to the number of strips 1 to be produced side by side, through which nozzles a thermoplastic substance is injected as a flowable mass onto the upper part of the drum 5. So that the zigzag or undulatory course of the strips is achieved, the device 6 is reciprocated backwards and forwards longitudinally of the drum which is adapted to rotate with the movement of the device 6.

The drum 5 is heated within a part designated by the numeral 8. The reinforcing threads 2 extending parallel with one another with constant spacing are brought onto the drum from a roller mechanism with a reversing roller 11 arranged near the heating zone 8, and threads 2 remain in contact with the drum 5 over a part of the periphery of the drum. The supply of heat to the drum 5 is so adapted to a thermoplastic material utilized that a connection is established between the strips 1 and the threads 2. The substance constituting the strips is initially softened in the heating zone and is thereafter cooled in passing a cooling zone 9 so that the connection between the strips 1 and the threads 2 sets. The fabricated sheet material reinforced by the threads 2 is thus produced and can be removed from the drum over a further roller mechanism having a reversing roller 12 and is wound onto a roller 2a. By adjusting the tension in the threads 2 the pressure with which the threads 2 are embedded in the strips 1 can be regulated. The drum 5 is provided with an outer covering, for example, of synthetic plastics material, which is repellent to the thermoplastic substance used.

I claim:

1. A fabricated sheet material for interconnecting lamellar bodies upon application of heat and pressure, said sheet material consisting of a plurality of symmetrically arranged strips lying side by side, each strip being composed of thermoplastic material and having a nonrectilinear course; and a plurality of rectilinear reinforcing threads extending parallel to one another and interconnecting the strips, said strips and threads are located in a common plane of symmetry.

2. A sheet material according to claim 1, wherein each strip extends in a zigzag manner.

3. A sheet material according to claim 2, wherein the distance between adjacent threads is less than the width between a trough and an adjacent crest of one of the strips.

4. A sheet material according to claim 2, wherein the troughs of one strip are aligned with the crests of the next adjacent strip.

5. A sheet material according to claim 1, wherein each strip extends in an undulatory manner.

6. A sheet material according to claim 5, wherein the distance between adjacent threads is less than the width between a trough and an adjacent crest of one of the strips.